United States Patent
Srivastava et al.

(10) Patent No.: US 8,268,419 B2
(45) Date of Patent: Sep. 18, 2012

(54) POLYPOUCH FOR PACKAGING OF SUPERIOR KEROSENE OIL

(75) Inventors: Umish Srivastava, Haryana (IN); Mahender Singh Negi, Haryana (IN); Vijay Kumar Chhatwal, Haryana (IN); Bijendra Singh Rawat, Haryana (IN); Ram Prakash Verma, Haryana (IN)

(73) Assignee: Indian Oil Corporation Limited, Faridabad, Haryana (IN)

( * ) Notice: Subject to any disclaimer, the term of this patent is extended or adjusted under 35 U.S.C. 154(b) by 555 days.

(21) Appl. No.: 12/519,559

(22) PCT Filed: Oct. 3, 2007

(86) PCT No.: PCT/IN2007/000453
§ 371 (c)(1),
(2), (4) Date: Jun. 17, 2009

(87) PCT Pub. No.: WO2008/075375
PCT Pub. Date: Jun. 26, 2008

(65) Prior Publication Data
US 2009/0304959 A1 Dec. 10, 2009

(30) Foreign Application Priority Data
Dec. 18, 2006 (IN) .......................... 2699/DEL/2006

(51) Int. Cl.
*B29D 22/00* (2006.01)
(52) U.S. Cl. .................................. 428/35.2; 428/475.8
(58) Field of Classification Search ................ 428/35.2, 428/475.8
See application file for complete search history.

(56) References Cited

U.S. PATENT DOCUMENTS

| 5,401,546 A | 3/1995 | Meattle | |
| 6,500,559 B2 * | 12/2002 | Hofmeister et al. | 428/474.4 |
| 6,599,639 B2 * | 7/2003 | Dayrit et al. | 428/475.8 |
| 2001/0010846 A1 | 8/2001 | Hofmeister et al. | |
| 2003/0017352 A1 * | 1/2003 | Dayrit et al. | 428/475.8 |
| 2009/0304959 A1 * | 12/2009 | Srivastava et al. | 428/35.2 |

FOREIGN PATENT DOCUMENTS

WO 97/30847 A1 8/1997
WO 02/074537 A1 9/2002

OTHER PUBLICATIONS

Exact Plastomers. Product Information [online]. ExxonMobil Chemical Company, 2005 Retrieved from the Internet: URL:http://www.exxonmobilchemical.com/Public_Products/EEB/Plastomers/Worldwide/Brochures_and_Cataloqs/Exa_Brochures_Overview. asp, p. 1, col. 1, para 1 and p. 2, col. 1, para a.

* cited by examiner

Primary Examiner — N. Edwards
(74) Attorney, Agent, or Firm — Ladas & Parry LLP

(57) ABSTRACT

The present invention relates to a novel polypouch for packaging of mineral oils. Said polypouch is made up of multi-layered polymeric sheet or film of different inventive thicknesses by co-extruded unique combination of low density polyethylene, nylon and adhesive resin resulting in negligible permeation loss of packed mineral oils e.g. kerosene oil.

9 Claims, 1 Drawing Sheet

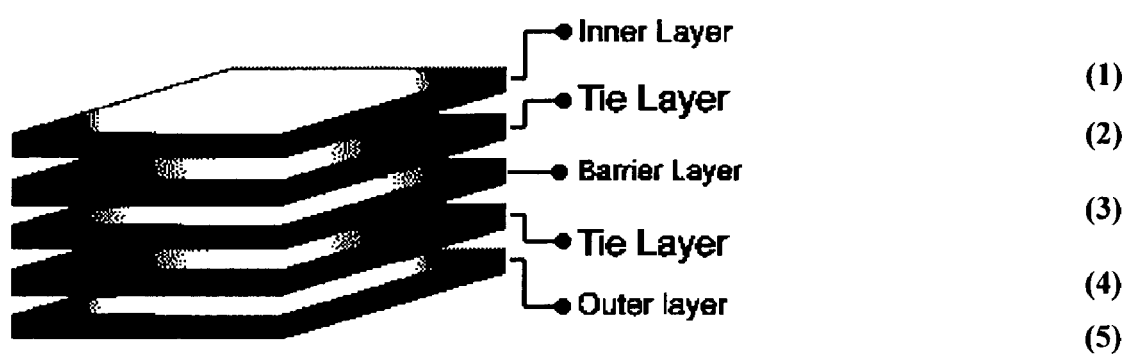

POLYPOUCH FOR PACKAGING OF SUPERIOR KEROSENE OIL

FIELD OF INVENTION

The present invention relates to a novel polypouch for packaging of mineral oils e.g. kerosene oil and method of preparation thereof. Said polypouch is made up of multilayered polymeric sheet or film of different inventive thicknesses formed by co-extruded unique combination of low density/linear low density polyethylene, nylon and adhesive resin resulting in negligible permeation loss of packed mineral oils.

BACKGROUND OF THE INVENTION

Prior art describes the environmentally friendly polymer film pouch made from a polyethylene film structure for the packaging of flowable materials. Thus U.S. Pat. Nos. 6,117,465, 5,942,579 and 5,721,025 describe a pouch made from a monolayer or multilayer film structure such as a two-layer or a three-layer coextruded film containing linear ethylene polymer and a high pressure low density polyethylene as a seal layer. A process for making a pouch for packaging flowable materials using a film structure of a blend of a linear ethylene interpolymer and a high pressure low density polyethylene is also disclosed.

U.S. Pat. No. 5,476,322 discloses a flexible, thin wall, multi-layer plastic film pouch having an open end and possessing high strength resistance against being manually torn or stretched and having heat sealingly laminated side margins and a rigidly brimmed wide mouth open end. This pouch is particularly useful for sealed containment and storage of liquids, solids, granulates and powders such as those commonly stored in other types of containers, e.g., jars, bottles, and cans. Use of this rigid mouth pouch will contribute greatly to source reduction of plastic waste in that this pouch can serve as a prefilled refill that can be conveniently inserted into reusable dispensing bottles, and by repeatedly replacing emptied prefilled refills a dispensing bottle can be reused numerous times. Also, this pouch can serve as a basic stand up container having substantially less disposable plastic than bottles.

U.S. Pat. No. 5,364,486 discloses a polymer film pouch made from a polyethylene film structure for the packaging of flowable materials, for example milk, including, for example, a pouch made from a multilayer film structure such as a two-layer or a three-layer co-extruded film containing at least one layer of ultra low density linear polyethylene, as a seal layer.

U.S. Pat. No. 5,288,531 discloses a polymer film pouch made from a polyethylene film structure for the packaging of flowable materials, for example milk, including, for example, a pouch made from a multilayer film structure such as a two-layer or a three-layer coextruded film containing at least one layer of ultra low density linear polyethylene, as a seal layer.

U.S. Pat. No. 5,360,648 discloses a polymer film pouch made from a homogeneously branched substantially linear ethylene inter-polymer film structure for the packaging of flowable materials such as milk, is disclosed. A pouch made from a multilayer film structure such as a two-layer or a three-layer co-extruded film containing at least one seal layer of a homogeneously branched substantially linear polyethylene is also disclosed. A process for making a pouch for packaging flowable materials using a homogeneously branched substantially linear ethylene inter-polymer film structure is also disclosed.

EP No. 0506348 discloses a film suitable for making medical solution pouches includes a first layer of ethylene propylene co-polymer blended with an elastomer; a polymeric adhesive layer; and an outer layer of a polyamide. Nylon 12 and copolymers thereof, nylon 11 and co-polymers thereof, nylon 66, nylon 610, and nylon 66/610 copolymer are especially preferred polyamides. One or more interior layers of at least one polyolefin such as an ethylene vinyl acetate copolymer, ethylene methyl acrylate copolymer, very low density polyethylene, ionomer, or blends of these materials, can also be included in the structure.

US Patent Application No. 200606083875 discloses lap sealable laminates and pouches that can withstand retort conditions, periods of storage and subsequent rethermalization are described. The laminate includes a core formed from at least one plastic strength layer of, for example, polyester, nylon, cast polypropylene or oriented polypropylene, and a barrier layer formed from ethylene vinyl alcohol copolymer, Nylon-MXD6, polyvinylidene chloride, an inorganic oxide coating or an organic coating. The core includes first and second major surfaces with a high temperature laminating adhesive. A retortable pouch with a longitudinal lap seal can be formed from the laminate on a form-fill-seal machine.

WO 9850230 discloses the use of a heat sealable multilayer film in manufacturing pouches for containing flowable materials which pouches are in tubular form and have transversely heat sealed ends, said film comprising at least one layer comprising about 10% by volume of the overall film structure and is made from an ethylene-styrene copolymer obtained using a single site catalyst polymerization process and one or more of the following layers: (a) at least one interpolymer selected from interpolymers of ethylene and one or more C3-C20 alpha-olefins made by polymerization processes using single site catalyst, non-single site catalyst and mixtures of such catalysts, and blends thereof, said interpolymers having a density in the range of about 0.87 to about 0.940 gm/cc and a melt Index of from about 0.2 to about 20 dg/minute and comprising about 10 to about 90% by volume of the overall film structure; (b) at least one barrier layer selected from nylon polymers comprising about 5 to about 30% by volume of the overall film structure; polyethylene terephthalate polymers comprising about 5 to about 15% by volume of the overall film structure; amorphous nylon comprising about 5 to 30% by volume of the overall structure; ethylene vinyl alcohol comprising about 5 to about 25% by volume of the overall film structure; (c) at least one tie layer comprising about 5 to about 15% by volume of the overall film structure and selected from ethylene vinyl acetate polymer, ethylene acid copolymers, ionomer or anhydride functionalized ethylene copolymers and (d) at least one high pressure ethylene homopolymer.

Indian Patent No. 192193 discloses a stand up pouch for mineral oils which is made up of a co-extruded sheet consisting of three layers wherein outer layer is selected from polypropylene film and a high molecular high density polyethylene film co-extruded with linear low density polyethylene film, the middle film is a low density polyethylene film co-extruded with linear low density polyethylene film and the inner film is high molecular high density polyethylene film co-extruded with linear low density polyethylene film. This patent does not talk about how much permeability of packed kerosene has been achieved actually in the said pouch to avoid any product loss owing to permeation from the pouch.

DISADVANTAGES OF THE PRIOR ART

Packaging of mineral oils such as kerosene oil in the form of polypouch is desired in the rural areas so that people residing in the rural areas can avail the mineral oils especially kerosene oil in small packing of 1 or 2 liters for their kerosene lamps and lanterns. People of rural areas cannot afford canned packaging or jerry can since it increases the price of the packed kerosene oil due to additional cost of the packaging involved.

Another major problem associated with the packaging of these mineral oils such as kerosene oil is their permeability due to their high volatile nature. Several polypouches have been disclosed in the prior art, which are made up of different polymeric materials but none of them discloses any combination of low density polyethylene, nylon and adhesive resin so as to restrict permeation loss of mineral oils to any minimum value. Moreover, none of them discloses any polypouch having innovative sheet or film having optimized thickness and having a layer of nylon which is sandwiched between two polyethylene layers in order to achieve no or negligible permeability of packed mineral oils especially kerosene oil along with the cost effectiveness and sufficient strength.

OBJECT OF THE INVENTION

The main objective of the present invention is to provide novel polypouches for packaging of mineral oils and method of preparation thereof.

Another objective of the present invention is to provide polypouch made up of multilayered polymeric sheet or film of different inventive thicknesses formed by co-extruded unique combination of low density polyethylene, nylon and adhesive resin.

Yet another objective of the present invention is to provide a polypouch which is capable of providing a packing and vending of mineral oils such as kerosene oil in quantities such as 1 or 2 liters.

Yet another objective of the present invention is to provide cost effective packaging of kerosene oil for the rural areas.

Yet another objective of the present invention is to provide a novel polypouch having negligible or no permeability in the range of 0.1% to 0.15% of packed mineral oils e.g. kerosene oil within 100 days period of storage at ambient atmospheric conditions.

SUMMARY OF THE INVENTION

The present invention relates to a polypouch that is made up of multilayered polymeric sheet or film of different inventive thicknesses formed by co-extruded unique combination of low density/linear low density polyethylene, nylon and adhesive resin. The polypouch disclosed in the present invention are suitable for the packaging of the mineral oils having flash point higher than 38 deg C. The present polypouch has better sealing and performance properties with negligible permeability along with cost effectiveness.

BRIEF DESCRIPTION OF DRAWINGS

In order to understand the invention and to see how the different layers of polymeric materials constitute a multilayer film of the present invention with reference to the accompanying drawings.

FIG. 1 showing how nylon layer or barrier layer (3) is sandwiched between two low density polyethylene outer and inner layers (1,5); and each adhesive resin layers or tie layer (2,4) is sandwiched between each low density polyethylene layer (1 and 5) and nylon layer or barrier layer (3).

DETAILED DESCRIPTION OF THE INVENTION

The present invention relates to a polypouch that is made up of multilayered polymeric sheet or film of different inventive thicknesses formed by co-extruded unique combination of low density polyethylene, linear low density polyethylene, nylon and adhesive resin. The present invention also relates to method of preparation of said polypouches.

In many packaging, there is a need for polypouches with multiple properties such as mechanical strength, barrier to oxygen or permeability, flexibility (or rigidity), moisture and chemical resistance, sealable at high or at low temperature, abrasion resistance, gloss surface and transparency or opacity.

In many cases, the combination of these properties cannot be achieved by using a single material. For this reason manufactures propose multilayer structures that exhibit a mix of the individual performances of the polymers in the multilayer structure.

The inventors with continuous efforts in their laboratories have come upon selected materials the details of which will be disclosed herein after. It is the choice of selected materials, and a combination thereof, along with their concentration and film/sheet thickness which has resulted in the manufacturing of a polypouch with desired properties.

According to present invention polypouch is made up of sheet/film having thickness 55-120µ and preferably 90-115µ wherein said sheet/film is made by co-extrusion of 2 to 25% by weight nylon, 3 to 18% by weight of adhesive resin and 10 to 70% by weight of combination of linear low density/low density polyethylene in which nylon layer or barrier layer (3) is sandwiched between two low density polyethylene/linear low density polyethylene outer and inner layers (1,5); and each adhesive resin layers or tie layer(2,4) is sandwiched between each low density polyethylene layer(1 and 5) and nylon layer or barrier layer(3).

The materials used in the manufacturing of said sheet/film are described herein under:

Nylon—The barrier layer in the multilayered film is made up of nylon having range of variations and in quantities ranging from 2 to 25% by weight. The types of nylon used in the invention are Nylon 6, Nylon 6,6; Nylon 6,6/6; Nylon 6,10; Nylon 6,12; Nylon 11, Nylon 12.

Linear Low/Low density Polyethylene—Linear low density polyethylene (LLDPE) grades (density range 0.905-0.935 g/cc as per ASTM D-1505 method) and Low density polyethylene (LDPE) grades (density range 0.915-0.925 g/cc as per ASTM D-1505 method) are blended together in the ratio ranging from 10 to 70% to form the inner and outer layer of the multilayered film.

Adhesive resins:—Adhesive layer or tie layer is made up of adhesive resins. The adhesive resins used in the present invention are consisting of a modified or unmodified homopolymer or copolymer of ethylene, methyl acrylate, ethyl acrylate, ethylene vinyl acetate, n-butyl acrylate, ethylene vinyl acetate copolymers, ethylene-alpha olefins and blends thereof.

Blown Film Coextrusion Method of Preparation of Polymeric Multilayered Film

Co-extrusion is a process where two or more resins are extruded simultaneously, and is often used to produce multi-layered films. It can be used to improve the barrier properties of films, to reduce cost or produce materials with difficult to achieve or incompatible properties.

The multilayer films are obtained by either co extrusion or extrusion coating of the resins of the different layers to result in a primary thick tube (primary tape) that is quickly cooled to stop or quench the crystallization of the polymers. The resulting quenched thick tube is thereafter reheated to the so-called orientation temperature and then biaxially stretched at this temperature by a tubular solid state orientation process using a trapped bubble. In said solid-state orientation step the primary tape is stretched in the transverse direction (TD) by inflation with air pressure to give a bubble, and in the longitudinal or machine direction (MD) by the differential speed between the two sets of nip rolls that contain the bubble.

It is widely known that with multi-layer films having a sealing layer comprising a polyethylene or an ethylene-alpha-olefin copolymer, the primary tape comprising said layer is preferably submitted to an irradiation step before orientation to improve bubble stability.

Generally therefore, in the industrial manufacture of heat-shrinkable multi-layer films having a sealing innermost layer comprising a polyethylene or an ethylene-.alpha.-olefin copolymer by a tubular process, either all the layers are coextruded, the tape is quenched, irradiated, reheated and oriented, or some of the layers, including the innermost layer that will become the sealing layer of the end packaging material, are extruded, the tape thus obtained is quenched, irradiated and coated by extrusion of the remaining layers thereon, quenched again, reheated and oriented.

Blown film coextrusion is a highly versatile technology covering a wide range of applications including complex structures based on 2 to 7 layers of different materials.

Melted polymer is extruded through a circular die and the tube is filled with air to blow it. Many parameters are adjustable to achieve the right properties but bubble stability is a critical one. For this reason, the rheological behavior of the materials is very important. Due to limited cooling, blown films generally exhibit lowers optical quality than cast films.

For multilayer structures, the choice of the right tie-layer system is key to guarantee both quality and economical performances.

Experimental Description

In order to establish the suitability of the developed poly-pouches towards the permeability of kerosene oil and for exploring the possibility of packaging kerosene in pouches, different poly film materials were employed for checking the permeation loss. Pouches were made of the following materials, kept under room temperature and their weight loss per day was observed:

TABLE NO. 1

| S. No. | Material Used | Remarks |
|---|---|---|
| 1. | Polyfilm (50μ) of LD 50%-LLD 50% | More than 5% permeation loss in 1 week at room temperature |
| 2. | Polyfilm (75μ) of LD 50%-LLD 50% | More than 4% permeation loss in 1 week at room temperature |
| 3. | Polyfilm (50μ) of LD 40%-LLD 60% | More than 5% permeation loss in 1 week at room temperature |
| 4. | Polyfilm (63μ) of LD 40%-LLD 60% | More than 5% permeation loss in 1 week at room temperature |
| 5. | Polyfilm (75μ) of LD 40%-LLD 60% | More than 4% permeation loss in 1 week at room temperature |
| 6. | Polyfilm (110μ) of LD 70%-HD 20%-LLD 10% | More than 4.5% permeation loss in 1 week at room temperature |
| 7. | Polyfilm made of butene based (120μ) LLD 70%-HD 30% | More than 4% permeation loss in 1 week at room temperature |
| 8. | IOC's commercial laminated pouch material (90μ) | Laminate started pealing off within first week itself |
| 9. | LD/Nylon/LD film (75μ) without lamination | Negligible permeation loss in first week (material selected for long term studies) |
| 10. | LD/EVOH/LD Film (55μ) | Negligible permeation loss in first week (material selected for long term studies) |
| 11. | 5 Layer Nylon based poly pouch (60μ) | Negligible permeation loss in first week (material selected for long term studies) |
| 12. | 5 Layer Nylon based poly pouch (90μ) | Negligible permeation loss in first week (material selected for long term studies) |
| 13. | Laminated multilayered film sample (120μ) | Lamination started peeling-off within first week. Not much of permeation loss. |
| 14. | Laminated multilayered film sample (150μ) | Lamination started peeling-off within first week. Not much of permeation loss. |
| 15. | Laminated multilayered film sample (110μ) with nylon layer | Negligible permeation loss in first week (material selected for long term studies) |

Abbreviations used in above table:
LD = Low density polyethylene
LLD = Linear low density polyethylene
HD = High density polyethylene
EVOH = Ethyl vinyl alcohol Pouches Design & Development Taking clue from the above screening studies, the multi-layered film materials having nylon barrier properties was selected for permeation studies of 120 days. Following test criteria was adopted to study the kerosene permeation loss from pouches:

Pouch Permeation Test Criteria

Based on following analysis, the criteria for testing permeation properties was initially set as 1% of product loss from the pouches and the time period for resulting in this criteria of 1% product weight loss was noted down:

IS 7394-84 specification mentions 3.5% product loss from the packaging material in 30 days ASTM F 852 for Gasoline and F 976 for Kerosene specification mentions 1% product loss in 30 days California regulation says 2.0 g per sq. m. per day of product loss Logic;

1.0 litre pouch under permeation test has a dimension of 324 mm×240 mm×0.09 mm) having a surface area of 0.156 sq. m.

Approximate kerosene weight in 1 litre pouch is 855 g

Following Californian regulation, (2×0.156) 0.312 g per day can be permitted to permeate from 1 litre pouch Thus, in 30 days, (30×0.312) 9.33 g is permitted to permeate 9.33 g is 1.09% of 855 g Hence, 1% was kept as the cut-off limit for testing the permeation properties of various types of bottles under test During the 120 days of kerosene permeation testing in laboratory, it was observed that laminated nylon based poly-films showed negligible permeation and un-laminated film showed permeation of about 0.14%. There was almost negligible product permeation loss from the nylon based poly pouches suggesting that nylon barrier is very effective for containing the permeation loss within minimum levels and definitely much below the initially stipulated permeation limit of 1% within 30 days. Thus, it was decided to select un-laminated film material for further pouch design studies.

Trial Filling of Pouches

Having got sufficient confidence on the efficacy of the nylon barrier properties in poly-films, the actual filling of pouches was undertaken in a specially developed Form-Fill-Seal (FFS) machine. Three different film thicknesses in the range of 55µ to 120µ, were got developed for filling 1 litre kerosene pouches on FFS machines.

The pouches being filled were tested on spot for strength by dropping them on ground, throwing them with force; standing upon them etc. It was found that the pouch material was strong enough to withstand the crude testing that it was subjected to at the time of filling.

After filling of pouches in all three thickness, the individual pouches were suitable coded as A (medium thickness), B (maximum thickness) and C (minimum thickness) before submitting to Indian Institute of Packaging for testing against standard test methods. For the purpose of secondary packaging, 15 pouches of 1 litre each were packed in PP crate having open able top lid. This was done to arrest any vapors of kerosene to come out of the packaging and also to contain kerosene from leaked pouch, if any.

Testing of Pouches at IIP, Mumbai

The following testing protocol was developed primarily to select the optimized thickness of pouches:

Vibration test of pouches filled in crates (frequency of 180 c pm, amplitude of 1" for 1 hour duration)

Drop test of pouches (from a height of 4' and a total of 6 drops per pouch on two faces, two seals and two sides respectively on the PP crate surface. Same pouches were again given 6 drops from a height of 6'. Thus, each pouch was subjected to a total of 12 drops during this test)

Drop test of pouches filled in crates (using metallic surface, 5 drops on bottom from a height of 4' and 10 drops from the height of 90 cm on each face and 4 diagonal faces. Same crates were taken after they have passed vibration test)

Pouch compression test (platen movement @ 10 mm per minute till pouch failure)

Stack load test (superimposed weight of 30 Kg equally distributed on top of two pouches for a period of 72 hours)

Heat seal strength (3 pouches were taken and sealing strength on top seal as well as vertical seal was carried out)

Tensile strength

Percent elongation

All the 3 thickness of pouches were tested as per the protocol above. The pouches in all thickness passed all of the tests.

Performance Testing

Short Duration Storage Stability

The filled pouches were subjected to short duration storage stability testing in the conditioning chamber of Packaging Research lab of IOC R&D Centre at Faridabad, under following conditions each for 48 hours:

45° C. and 80% RH
45° C. and 30% RH
20° C. and 80% RH
20° C. and 30% RH 10 pouches were kept in the conditioning chamber under each condition and were checked after every 12 hours for any leakage or weight loss. At the end of 48 hours, none of the pouches showed any leakage, abnormal appearance and all the pouches showed negligible permeation loss under each of the test conditions during this test.

Accelerated Storage Stability Test on Filled Pouches

A three month long study was carried out to check the long term accelerated storage stability of pouches with the following objectives:

To assess the basic physico-chemical and physical properties of the packaging materials used for filling the kerosene pouches To expose the pouches under following accelerated storage conditions:

Exposed to ambient conditions of temperature and relative humidity

Exposed to 45° C. temperature

Exposed to 45° C. temperature & 75-80% relative humidity

To draw filled pouches at regular intervals from each of the above storage areas and carry out following product quality and product-package compatibility tests:

Pouch
Appearance of the pouches
Heat Seal Strength
Leakage through pouches
Loss in weight on exposure
Drop Test on filled pouches
Kerosene:
Copper Strip Corrosion
Density at 15° C.
Distillation recovery
Final boiling Point
Flash Point
Smoke Point At the end of the three-month storage stability testing, Indian Institute of Packaging has given a test report, the salient features of which are summarized below:

A. Results of Test Performed on Film:

| Tensile Strength (Kg/cm2) | | | |
|---|---|---|---|
| Machine direction | | 301.21 Kg/cm2 | |
| Transverse direction | | 248.81 Kg/cm2 | |
| Elongation Test: | | | |
| Machine direction | | 592% | |
| Transverse direction | | 577.2% | |
| Dart Impact Test | | | |
| Drop height = 1524 mm | | | |
| % Failure | 20% | 90% | 50% |
| Gram force | 465 | 505 | 482 |

B. Results of Test Performed on Exposed Pouches

Appearance

Haziness of pouch material increases in the following order
Exposed to ambient conditions of temperature and Relative Humidity—Minimum Haziness
Exposed to 45° C. temperature—Moderate Haziness
Exposed to 45° C. temperature & 75-80% relative humidity—Maximum Haziness 2. Leakage Test Exposed to ambient conditions of temperature and Relative Humidity—No leakage
Exposed to 45° C. temperature—Slight leakage from seal of one pouch each at the end of $1^{st}$ week and $12^{th}$ week.
Exposed to 45° C. temperature & 75-80% relative humidity—Slight leakage from seal of one pouch in the $1^{st}$ week.

Seal Strength a) Machine Direction

TABLE NO 2

| Number of Weeks | Ambient temp & RH | 45° C. Temp | Temp 45° C. RH 75-80 |
|---|---|---|---|
| 0 | 2.69 | 2.69 | 2.69 |
| 2 | 2.52 | 2.05 | 2.11 |
| 3 | 2.01 | 2.23 | 2.42 |
| 4 | 1.98 | 2.18 | 2.19 |
| 6 | 1.20 | 2.14 | 2.14 |
| 8 | 2.25 | 1.94 | 2.24 |
| 10 | 2.18 | 2.14 | 2.35 |
| 12 | 2.31 | 2.24 | 2.09 |
| 14 | 1.99 | 2.26 | 1.90 | b) Transverse Direction

TABLE NO 3

| Number of Week | Ambient Temp & RH | 45° C. Temp | Temp 45° C. RH 75-80 |
|---|---|---|---|
| 0 | 2.72 | 2.72 | 2.72 |
| 2 | 2.69 | 2.75 | 2.90 |
| 3 | 2.54 | 2.68 | 2.50 |
| 4 | 2.76 | 2.74 | 2.90 |
| 6 | 2.84 | 2.73 | 2.70 |
| 8 | 2.53 | 2.51 | 2.43 |
| 10 | 2.49 | 2.32 | 2.62 |
| 12 | 2.34 | 2.69 | 2.70 |
| 14 | 2.48 | 2.80 | 2.81 |

The seal strength pattern showed that there is some erosion of sealing strength upon continued storage of the pouch. However, the seal strength at the end of 14 weeks itself was found to be sufficient to serve the purpose which was further confirmed by the drop test results. This factor has been adequately taken into consideration at the time of finalizing the specifications of the pouch at the end of the present study.

Kerosene Quality

It was observed that the kerosene quality did not undergo any appreciable change during accelerated storage testing and remained within its specifications. The pouch-kerosene compatibility has been found to be excellent in all the three conditions of accelerated storage stability test conducted under most severe test conditions at Indian Institute Of Packaging, Mumbai.

Conclusions Based on Studies of IIP, Mumbai

Based on the studies conducted in accelerated storage stability testing of filled kerosene pouches, Indian Institute of Packaging's test report gives following conclusions:

Pouch material selected for packaging of kerosene is found to be acceptable with respect to the parameters tested i.e. for appearance, strength, permeability etc.

The product-package compatibility found to be okay.

From storage studies carried out at accelerated and ambient conditions it is found that pouch is suitable for shelf life of maximum 3 months.

5.2.4.3 Lone Duration Stability Testing

Followed by the accelerated storage study testing done by IIP, Mumbai, the pouches stored in the Packaging Lab of IOC R&D Centre, Faridabad; were further got tested after the end of 10 months and 12 months respectively from IIP, Mumbai, for their performance related properties. Following is the summarized test results of all the testing carried out on pouches:

TABLE NO 4

| Test | Zero Month | Three Months | Ten Months | Twelve Month |
|---|---|---|---|---|
| Tensile strength | | | | |
| MD | 269 | 301 | | |
| TD | 241 | 248 | | |
| Percent elongation | | | | |
| MD | 566 | 592 | | |
| TD | 642 | 577 | | |
| Dart impact (*) | 967 | 482 | | |
| Heat seal strength | | | | |
| Top | 2.69 | 1.99 | 2.422 | 2.41 |
| Vertical | 2.36 | 2.48 | 2.679 | 2.41 |
| Drop impact from a height of 4' | Pass | Pass | Pass | Pass |
| Compression strength, Kgf | 230 | — | 180 | 126 |

(*) There was huge variation in the Indian Institute Of Packaging's result of Dart Impact values in the initial month compared to the three-month period. In order to further study this discrepancy, Dart Impact value was also tested on the same material at IOC R&D Centre, Faridabad, and was found to be in the range of 400 of which has thus been included in the finalized specification of the pouches at the end of this study.

6. Final Specification of 1 Litre Kerosene Pouch

Poly Pack Specification for Packaging Kerosene

| SPECIFICATION (IS: 2508) | DETAIL |
|---|---|
| Material | 5 layer nylon based natural film |
| Description of material | Multi layered co-extruded film made from a blend of Linear Low Density Poly Ethylene/low density polyethylene-Adhesive-Nylon-Adhesive- Linear Low Density Poly Ethylene/low density polyethylene<br>Nylon content should be in the range from 2 to 25% |
| Description of packing | 15 Nos. of poly bags containing 1 litre of kerosene packed in tube wise manner in a secondary packaging of PP Crates covered from lid from top |

| SPECIFICATION (IS: 2508) | DETAIL |
| --- | --- |
| Type of pouch | 3 sides sealed pillow shaped pouch filled in tube wise manner |
| Type of seal | Band seal with a minimum band width of 3.5 mm in vertical side and 5 mm on horizontal side |
| Thickness (micron) | Ranging from 55μ minimum to 120μ maximum |
| Dimension of pouch (in mm) [L × B] | 255 ± 5 mm × 164 ± 2 mm |
| Volume of kerosene to be packed in each pouch | 1 litre |
| Workmanship | The film should be uniform in color, texture and finish and also free from pinholes, undispersed raw materials, streaks and particles of foreign matter. There should be no other visible defects, such as holes, tears or blisters. The edges should be free from nicks and cuts visible to unaided eye. |
| Dart Impact Strength (gf) at 50% failure as per IS 2508 | 425 |
| Tensile Strength (Kgf/cm$^2$) as per IS 2508 | 275 in M.D. and 240 in T.D. (minimum) |
| Elongation (%) as per IS 2508 | 560 in M.D. and 640 in T.D. (minimum) |
| Heat Seal Strength (Kg/15 mm) ASTM F-88 | 2.65 mm in vertical direction and 2.35 mm in horizontal direction (minimum) |
| Drop Test (3 Nos. of pouches filled/sealed with 1 litre kerosene dropped from a height of 1.8 m) IS 7028 | Neither damage nor leakage should be observed in the pouch in all the 6 drops (front, back, 2 vertical edges and 2 horizontal edges) |
| Vibration Test (15 Nos. of filled pouches placed in PP crates in upright position and vibrated for 1 hour at a frequency of 180 cps and an amplitude of 2.54 cms) IS 7028 | Neither leakage nor damage to the pouch should be observed from any of the tested pouches after vibration |
| Pouch Compression Test (Kgf) (Completely filled and sealed pouch with 1 litre of kerosene to be placed in between platens of a compression machine and platen to move @ 10 mm per minute) IS 7028 | Filled pouches should not fail/leak upto a minimum load of 100 kgf |

We claim:

1. A polypouch for packaging of mineral oils having negligible permeation loss of packed mineral oils comprising:
a multilayered polymeric sheet or film of optimized thickness comprising a nylon layer or a barrier layer (3) which is sandwiched between two low density/linear low density polyethylene outer and inner layers (1,5), each adhesive resin layers or tie layers (2,4) being sandwiched between each low density/linear low density polyethylene layer(1,5) and nylon or barrier layer (3);
wherein said sheet or film is formed by co-extruding the layers in a percent by weight combination such that the nylon layer or barrier layer (3) is 2-25% by weight of nylon, the adhesive resin layers or tie layers (2,4) are 3 to 18% by weight of adhesive resin, and the low density/linear low density polyethylene outer and inner layers (1,5) are 10 to 70% by weight of low density/linear low density polyethylene.

2. A polypouch as claimed in claim 1 wherein said multilayered polymeric sheet or film has thickness range of 55-120μ.

3. A polypouch as claimed in claim 1 wherein said polypouch has capacity of 1 or 2 liters.

4. A polypouch as claimed in claim 1 wherein said nylon or barrier layer is made up of nylon selected from Nylon 6, Nylon 6,6; Nylon 6, 6/6; Nylon 6,10; Nylon 11, Nylon 12.

5. A polypouch as claimed in claim 1 wherein said low density/linear low density polyethylene layer is made up of a blend of low density polyethylene having density range of 0.915-0.925 g/cc as per ASTM D-1505 method and linear low density polyethylene having density range of 0.905-0.935 g/cc as per ASTM D-1505 method.

6. A polypouch as claimed in claim 1 wherein said adhesive resin layer or tie layer is made up of adhesive resins selected from modified or unmodified homopolymers or copolymer of ethylene, methyl acrylate, ethyl acrylate, ethylene vinyl acetate, n-butyl acrylate, ethylene vinyl acetate copolymers, ethylene-alpha olefins and blends thereof.

7. A polypouch as claimed in claim 1 has a permeation loss of said mineral oil is 0.1% to 0.15% in 120 days.

8. A polypouch as claimed in claim 1 has sufficient storage life of 3 months and has compression strength of 100 Kgf minimum.

9. A polypouch as claimed in claim 1 wherein said multilayered polymeric sheet or film has thickness range of 90-115μ.

* * * * *